Aug. 19, 1958 R. E. ALLISON 2,848,539

AUDIOMETER

Filed March 8, 1954 2 Sheets-Sheet 1

RALPH E. ALLISON
INVENTOR.

BY Hazard & Miller

ATTORNEYS

Aug. 19, 1958 R. E. ALLISON 2,848,539

AUDIOMETER

Filed March 8, 1954 2 Sheets-Sheet 2

RALPH E. ALLISON
INVENTOR.

BY Hazard & Miller

ATTORNEYS 2,848,539
Patented Aug. 19, 1958

2,848,539

AUDIOMETER

Ralph E. Allison, Puente, Calif., assignor to Patent Management, Incorporated, Minneapolis, Minn., a corporation of Minnesota Application March 8, 1954, Serial No. 414,812
4 Claims. (Cl. 179—1)

Figure 1:
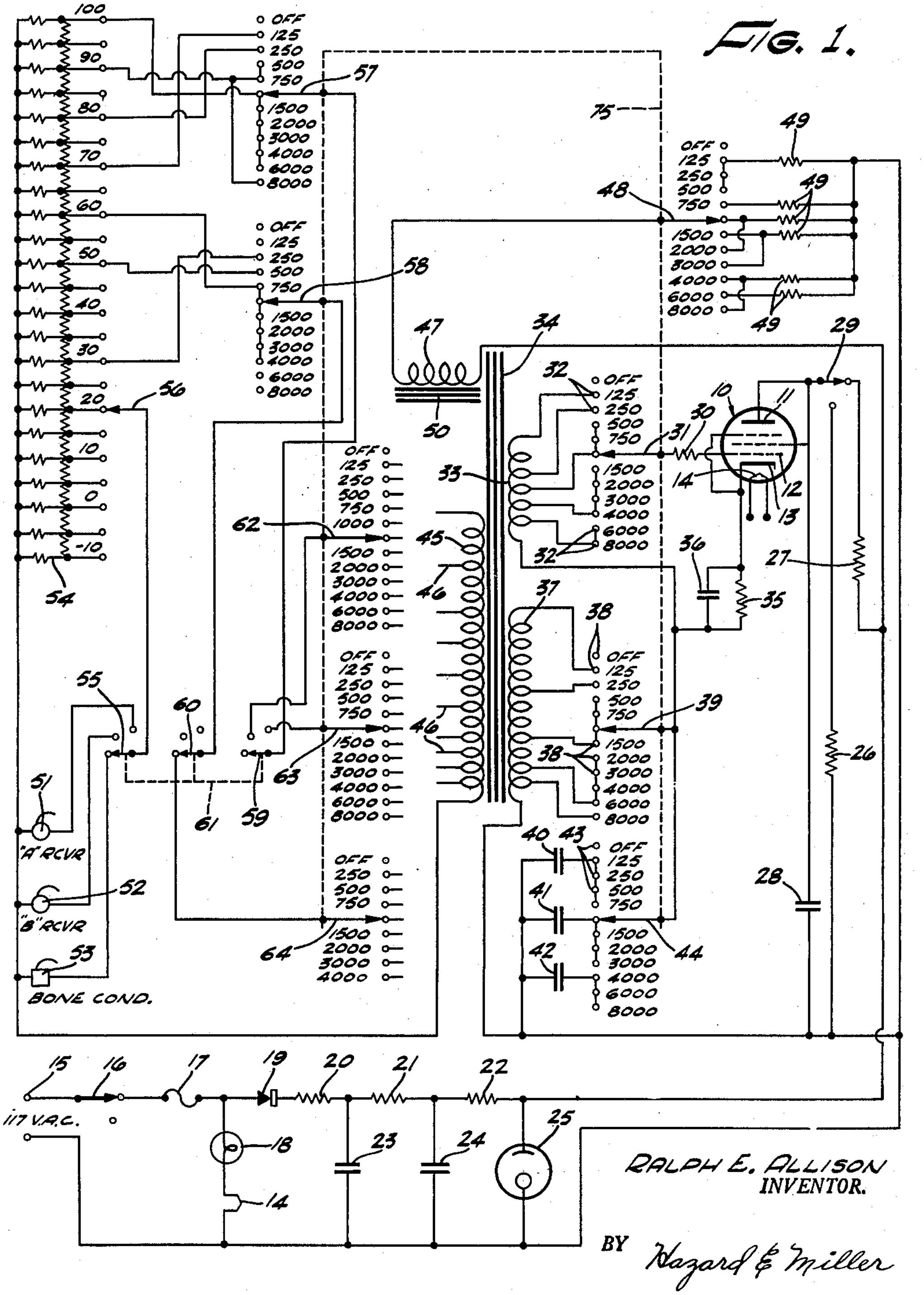

This invention relates to improvements in audiometers, and may be regarded as an improvement over the construction disclosed in my prior United States Letters Patent No. 2,471,136, issued May 24, 1949.

Explanatory of the present invention, it is desirable for economic reasons to employ in an audiometer a conventional or standard air conducting receiver or earphone. The construction of the standard ear conducting receiver, however, is such that the acoustical output from the receiver at different frequencies varies even though the supplied voltage may remain constant. Thus, at one frequency a given air conducting receiver may produce an acoustical output of a certain magnitude at a given voltage supplied thereto. At another frequency the same receiver may have either a higher or lower acoustical output at the same supplied voltage. Even air conducting receivers whose mechanical construction appears to be identical do not usually have the same acoustical output at given frequencies for the same voltage input.

In my prior patent above mentioned, I have attempted to provide a suitable correction or compensation for these varying characteristics of the reecivers by interposing a resistance-type equalizer between the signal generator and the attenuator. In a typical commercial audiometer having two air conducting receivers and a bone conducting receiver this requires a selection of thirty-two individual resistors, each one specifically selected for the particular audiometer in which it is to be used for the particular receivers which are to be used. A considerable amount of time is required in commercial practice in selecting and placing these resistors in the circuit. This selection could, of course, be avoided by the use of individual volume controls for each position or each selection of frequency. However, the use of such a large number of volume controls not only involves considerable expense but would require more space than would be available in ordinary portable audiometers.

A primary object of the present invention is to provide an improved audiometer wherein the signal generator which is capable of producing alternating currents of predetermined frequencies has a tapped output winding. The audiometer also has one or more receivers and an attenuator to which the receivers can be selectively connected. By means of a switch section on the frequency switch a circuit for each frequency may be selected through the attenuator and through the receiver. Each receiver has in association therewith a second switch section on the frequency switch whose stationary contacts are cross-connected to the taps of the output winding.

It will be appreciated by those skilled in the art that the output winding of the signal generator may have as many taps thereon as may be required spaced along the length of the output winding. Adjustment of the acoustical output of a selected receiver at a given frequency can thus be made by connecting a strap to the stationary contact on the switch section, which corresponds to that frequency and experimentally determining the proper tap on the output winding to which it should be connected to cause the receiver to deliver the required acoustical output for that frequency. After such output winding tap has been ascertained the strap is permanently connected thereto. This is repeated for each of the contacts for the frequencies on the switch section of the frequency switch. In this manner, regardless of the individual characteristics of the particular receiver that is used correction or compensation can be readily and accurately made to cause the receiver to deliver the proper acoustical output for each frequency within the range of the audiometer.

It has been proposed to produce an audiometer having two air conducting receivers and a bone conducting receiver, one air conducting receiver being applicable to each ear of the person whose hearing is being tested with the audiometer. However, as above explained the air conducting reecivers, even though they appear to be identical in mechanical construction, may have radically different characteristics. The bone conducting receivers naturally have characteristics different from either of the air conducting receivers. The air conducting receivers and bone conducting receivers may be optionally connected to the attenuator and the frequency circuit selected within the range of the instrument. By means of the present invention it is immaterial what the individual characteristics of the receivers may be. When any one of these transducers is selected and is operatively connected to the attenuator and a frequency circuit has been selected compensation is automatically and accurately made to correct for the characteristics of the particular transducer that is placed in the circuit.

Figure 2:
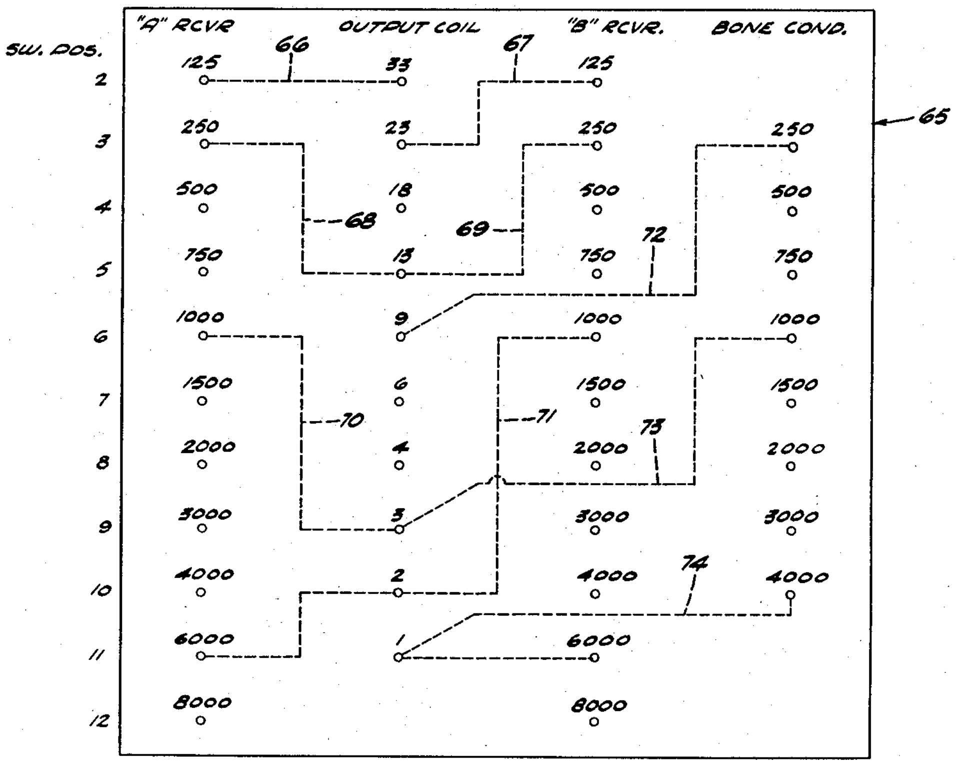
Figure 3:
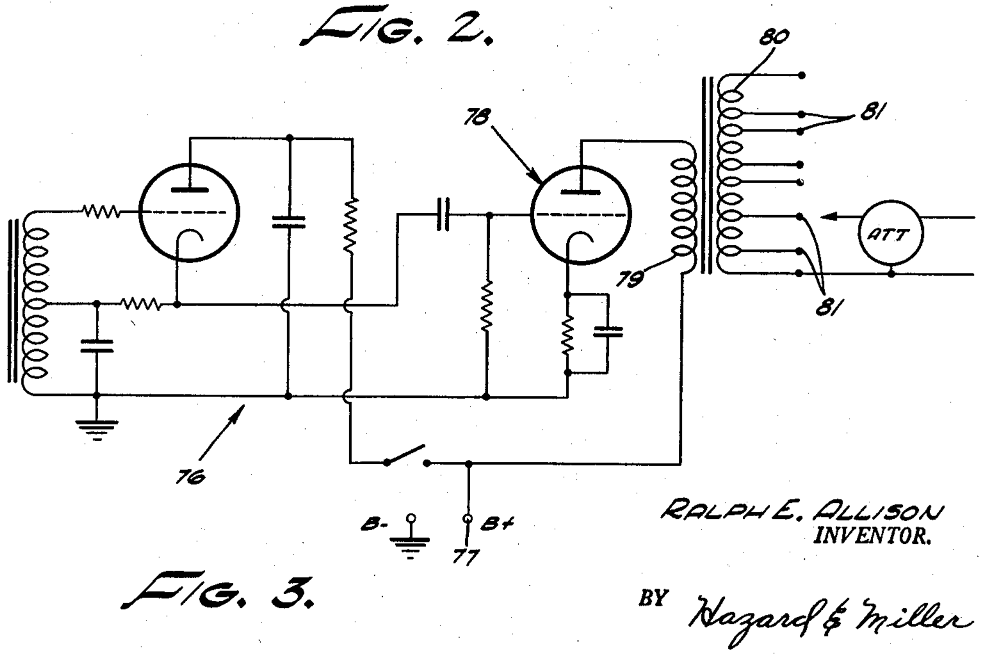

With the foregoing and other objects in view, which will be made manifest in the following detailed description and specifically pointed out in the appended claims, reference is had to the accompanying drawings for an illustrative embodiment of the invention wherein:

Figure 1 is a wiring diagram of an audiometer embodying the present invention;

Fig. 2 is a diagram of a terminal block illustrating typical "strapping" that may be utilized to make suitable compensation for the characteristics of two air receivers and a bone conductor; and Fig. 3 is a wiring diagram of an alternative form of signal generator that may be employed which has a tapped output winding enabling the present invention to be advantageously employed in conjunction therewith.

Referring to the accompanying drawings wherein similar reference characters designate similar parts throughout, I have illustrated on Fig. 1 a signal generator consisting of an electronic oscillator. This includes a thermionic tube 10 shown as consisting of a pentode connected as a triode for the purpose of obtaining adequate power output. In the tube there is illustrated a plate 11, a grid 12, a cathode 13 and a heating filament 14. The tube is shown as being powered from an alternating current supply, the leads of which are indicated at 15, and include a switch 16 and a fuse 17. A ballast tube 18 is connected across the leads and to the filament 14 so that the filament may be heated. 19 indicates a selenium rectifier and beyond the rectifier there are resistances 20, 21 and 22, and condensers 23 and 24 are connected, as illustrated. 25 indicates a voltage regulator tube so that the rectified direct current supplied to the signal generator will be of a substantially constant value. Any other source of direct current may be employed in lieu of the rectifying system above described. This rectifier, however, is preferable in order to enable the audiometer to be powered from conventional or usual sources of supply of alternating current.

The two direct current leads have resistances 26 and 27 therein and a condenser 28 connects the plate 11 to ground. 29 indicates a tone-on and tone-off switch, the details of which may conform to the construction disclosed in my copending United States application Serial No. 347,791 filed April 9, 1953. When this switch is connected as illustrated current high potential is supplied to the plate 11 and a signal is being generated. However, when the switch is disconnected from the source of high potential through the resistance 27 and is connected to ground through the resistance 26 a gradual decay of the generated signal occurs as the condenser 28 discharges through the resistance 26.

The grid 12 is connected through a resistance 30 to one section 31 of a frequency selector switch arranged to engage contacts or taps 32 of a feed-back winding 33 which is adjacent core 34. This feed-back winding is in turn connected through a biasing resistor 35 which is shunted by a bypass condenser 36 to the cathode 13. 37 indicates a tuning winding associated with the core 34 and having taps 38 connected to another section 39 of the frequency selector switch. 40, 41 and 42 are condensers which are connected to the stationary contacts 43 of another section 44 of the frequency selector switch. The two sections 39 and 44 of the frequency selector switch are electrically connected together and to the conductor connected to the cathode 13 with the feed-back winding 33.

In association with the core 34 there is an output winding 45 which has taps 46 spaced at suitable intervals along its length. If the core 34 is made in the form of a duplicate core which is the preferred arrangement the inductance of the tuning winding 37 may be varied by incorporating in the audiometer the principle of the invention disclosed in my copending United States pending application Serial No. 273,909 filed February 28, 1952, and the principle of the invention disclosed in my copending United States application Serial No. 376,881 filed August 27, 1953. I have, consequently, illustrated in association with the core 34 a coil 47 energized from the source of direct current through still another section 48 of the frequency selector switch. The movable contact of this section traverses taps or stationary contacts that are connected to resistances 49. The core of the coil 47 indicated at 50 is consequently illustrated at right angles to the lengths or planes of the two cores which make up the core 34.

The above-mentioned sections of the frequency selector switch are mechanically connected together as illustrated by the dotted line 75 which causes the movable contacts of all of these sections to be moved in unison. In other words, a shifting of the frequency selector switch causes the movable contacts of the sections 31, 39, 44 and 48 to be simultaneously moved or shifted to the corresponding taps or stationary contacts. In this manner, the signal generator can be caused to selectively create a signal of the desired frequency.

51 indicates one air conducting receiver, and 52 indicates another air conducting receiver. 53 indicates a bone conducting receiver. One side of each of these transducers is connected to an attenuator generally indicated at 54, while the other side of each of these transducers is connected to the stationary contacts of a selector switch 55. By shifting the movable contact of the selector switch 55, any one of these transducers may be connected to a movable contact 56 on the attenuator that is engageable with the taps thereof.

Associated with the attenuator and electrically connected thereto is still another section of the frequency selector switch. This section is indicated at 57 and is operated in unison with the sections 31, 39, 44 and 48, as previously explained. The section 57 may be used with either the air conducting receiver 51 or the air conducting receiver 52. There is also associated with the attenuator and electrically connected thereto another section of the frequency selector switch. This section is indicated at 58 and is used in conjunction with the bone conducting receiver 53. The sections 57 and 58 are connected to sections 59 and 60 of the selector switch 55, and these sections are shown as being mechanically connected to the selector switch 55 by dotted lines 61 so that all sections of the selector switch 55 will be operated in unison. In other words, when the selector switch 55 connects the bone conducting receiver 53 to the attenuator as illustrated, section 60 connects section 58 of the frequency selector switch so that this section may be utilized. On the other hand, if selector switch 55 connects either of the air conducting receivers 51 or 52 to the attenuator, section 60 disconnects section 58 and section 59 serves to connect section 57 of the frequency selector switch.

As part of the frequency selector switch there are three additional sections 62, 63 and 64. Section 62 is associated with the air conducting receiver 52 and is consequently connected to that stationary contact of the section 59 which will be engaged by the movable contact of that section when selector switch 55 is shifted to connect the air conducting receiver 52 to the attenuator 54. Similarly, the section 63 of the frequency selector switch is connected to that stationary contact of the section 59 which will be engaged when the selector switch 55 connects air conducting receiver 51 with the attenuator. Section 64 of the frequency selector switch is electrically connected to the section 60 of the selector switch 55.

The three sections 62, 63 and 64 of the frequency selector switch may have their stationary contacts or taps connected to terminals on a terminal block or board, such as illustrated on Fig. 2. The taps of the output winding 45 of the signal generator may likewise be arranged on the same board or terminal block which is identified by the reference character 65 on Fig. 2.

As above explained, the audible output of the air conducting receiver 51 may be of a certain magnitude at a certain frequency. This may be modified or corrected by varying the voltage supplied from the output winding 45. Thus, if the audible output of the air conducting receiver 51 at a given frequency is of a low value, that is, of a value lower than the value desired at this frequency, correction may be made by supplying a higher voltage from the output winding. On the other hand, if the characteristics of the air conducting receiver 51 are such that the audible output is higher than it should be at the selected frequency, this may be corrected by decreasing the voltage supplied from the output winding 45. As a typical example of how such corrections can be made for the transducers, I have illustrated in dotted lines the strapping or cross connections that are rendered possible by the use of the tapped output winding 45 and the sections 62, 63 and 64 of the frequency selector switch. Thus, I have illustrated a strapping connection 66 between the 125-frequency contact of section 63 which is associated with the air conducting receiver 51 and the 33 tap of the output winding 45. On the other hand, the characteristics of the air conducting receiver 52 may be sufficiently different from the characteristics of the receiver 51 that it is necessary to correct or compensate for the difference. I have, consequently, shown the 125-frequency tap of section 62 connected to the 23 tap of the output winding 45 as indicated by the strapping connection 67. At the 250-frequency the characteristics of both receivers 51 and 52 may be identical, that is, at this frequency both receivers may deliver the same audible output for the same supplied voltage. I have, consequently, illustrated as part of the typical illustrations that both corresponding taps of the sections 62 and 63 are connected to the same 13 tap of the output winding 45 by means of the strapping connections indicated at 68 and 69. At 1000-frequency the characteristics of the two air conducting receivers 51 and 52 may again be similar to the characteristics at 125-frequency. Consequently, I have illustrated the 1000-frequency taps of the sections 63 and 62 as being connected by straps 70 and 71, respectively, to the 3-tap and the 2-tap of the output winding 45, respectively.

In a similar manner I have illustrated the contacts of section 64 of the frequency selector switch which is associated with the bone conducting receiver 53 as having been connected to the taps of the output winding 45. These connections or straps are indicated by the reference characters 72, 73 and 74, respectively.

It will be understood that the strapping connections shown on Fig. 2 are merely representative or typical of the type of strap connections that may be made between the sections 62, 63 and 64 of the frequency selector switch and the taps of the output winding 45. These strapping connections naturally will vary, depending upon the characteristics of the particular receivers or transducers 51, 52 and 53 that are employed. It will be appreciated that as the taps on the output winding 45 may be spaced at any desired intervals along its length and that any number of taps may be used that by merely selecting the proper strapping connection on the board or terminal block 65, virtually any voltage required to cause the receiver to deliver the proper acoustical output may be taken off for any selected frequency.

The usual manner in which the particular strapping connection is determined upon is to adjust the frequency selector switch to a desired frequency, then if the selector switch 55 is adjusted to connect receiver 51 to the attenuator, for example, the strapping connection is first connected to the stationary contact of the section 63 corresponding to the selected frequency. The strapping connection is then temporarily connected to a tap 46 of the output winding 45 and the audible output of the receiver 51 is then tested. If the audible output of the receiver is high or low for the selected frequency, the other taps 46 on the output winding are tried. This process of trial and error and elimination of taps is continued until the proper tap 46 is located which will cause the receiver to deliver the proper audible output at the selected frequency. The connection to that tap 46 on the output winding is then made permanent. This procedure is followed with respect to all of the stationary contacts of the three sections 62, 63 and 64 of the frequency selector switch.

After the strapping connections have been made, it will be appreciated that when the frequency selector switch is turned or adjusted for any selected frequency that proper connections between the three sections 62, 63 and 64 and the output winding of the signal generator will be automatically made to cause whichever transducer is being used to deliver the proper audible output for the selected frequency.

It will be appreciated by those skilled in the art that by means of the strapping connections between the three sections 62, 63 and 64 of the frequency selector switch that a high degree of versatility is permissible to make the correction or compensation for the characteristics of the particular transducers that are used in the audiometer.

In Fig. 3 an alternative form of construction is disclosed which differs from the construction previously described primarily in the form of the signal generator. In this wiring diagram 76 generally indicates an oscillating circuit energized by a B-battery 77. This signal generator is shown as including an additional amplifying tube 78 which causes the wiring 79 to be energized with a predetermined frequency. The output winding 80 is shown as provided with taps 81 which can be connected to the stationary contacts of one or more sections of a frequency selector switch, which sections are associated with their respective receivers or transducers. In other words, from the taps 81 of the output winding 80, which taps correspond to the taps 46 of the output winding 45, there may be strapping connections to one or more sections of the frequency selector switch corresponding to the sections 62, 63 and 64 of the frequency selector switch shown on Fig. 1. These sections of the frequency selector switch may in turn lead to the corresponding sections 57 and 58 of the frequency selector switch through the attenuator and to the transducers.

It will be appreciated by those skilled in the art that by using a tapped output winding from the signal generator and providing appropriate strapping connections between the taps thereof and sections of the frequency selector switch, each of which is associated with a receiver, that each receiver can be easily and automatically caused to deliver the proper acoustical output for any selected frequency within the range of the instrument.

The strapping connections herein disclosed will ordinarily be mere conductors or shunting connections. However, under certain circumstances they may have resistors of low value incorporated therein. The term "strapping connections" as herein used is intended to include both types, that is, with or without low value resistors.

Various changes may be made in the details of construction without departing from the spirit and scope of the invention as defined by the appended claims.

I claim:

1. In an audiometer, a signal generator capable of producing alternating currents of predetermined frequencies and having an inductor and tapped output winding magnetically connected thereto, a frequency selector switch connected to the signal generator having a first section for selecting the frequency delivered by the output winding, a transducer, a second section on the frequency selector switch connectable to the transducer, said second section having stationary contacts and a movable contact mechanically connected to the first section for movement in unison therewith, the stationary contacts of the second section and the taps on the output winding having strapping connections therebetween whereby at any frequency selected by the frequency selector switch proper voltage will be supplied by the output winding to cause the transducer to deliver the proper acoustical output for the selected frequency.

2. In an audiometer, a signal generator capable of producing alternating currents of predetermined frequencies and having an inductor and a tapped output winding magnetically connected thereto, a frequency selector switch connected to the signal generator having a first section for selecting the frequency delivered by the output winding, a transducer, an attenuator connectable to the transducer, a second section on the frequency selector switch controlling the circuits through the attenuator to the transducer, a third section on the frequency selector switch connectable to the second section, said third section having stationary contacts, said second and third sections having movable contacts mechanically connected to each other and to the first section for movement in unison therewith, the stationary contacts of the third section and the taps on the output winding having strapping connections therebetween whereby at any frequency selected by the frequency selector switch proper voltage will be supplied by the output winding to cause the transducer to deliver the proper acoustical output for the selected frequency.

3. In an audiometer, a signal generator adapted to produce alternating currents of predetermined frequencies, said signal generator having a tapped inductor for frequency control and a tapped output winding magnetically connected to the tapped inductor, a frequency selector switch, an attenuator connected to the output winding, a transducer in circuit with the attenuator and the output winding, a plurality of stationary contacts associated with the transducer, a movable contact electrically connected to the transducer movable in unison with the frequency selector switch adapted to traverse said stationary contacts, and strapping connections between the taps of the ouput winding and said stationary contacts.

4. In an audiometer, a signal generator adapted to produce alternating currents of predetermined frequencies, said signal generator having a tapped inductor for frequency control and a tapped output winding magnetically connected to the tapped inductor, a frequency selector switch, an attenuator connected to the output winding, a plurality of transducers selectively connectable across the output of the attenuator, each transducer having a plurality of stationary contacts associated therewith, a movable contact for each transducer electrically connectable thereto adapted to traverse the stationary contacts associated with that transducer, said movable contacts being mechanically connected to the frequency selector switch so as to be movable in unison therewith, and strapping connections between the taps of the output winding and the stationary contacts associated with each transducer.

References Cited in the file of this patent

UNITED STATES PATENTS

| | | |
|---|---|---|
| 2,310,588 | Mages | Feb. 9, 1943 |
| 2,471,136 | Allison | May 24, 1949 |